Figure 1:
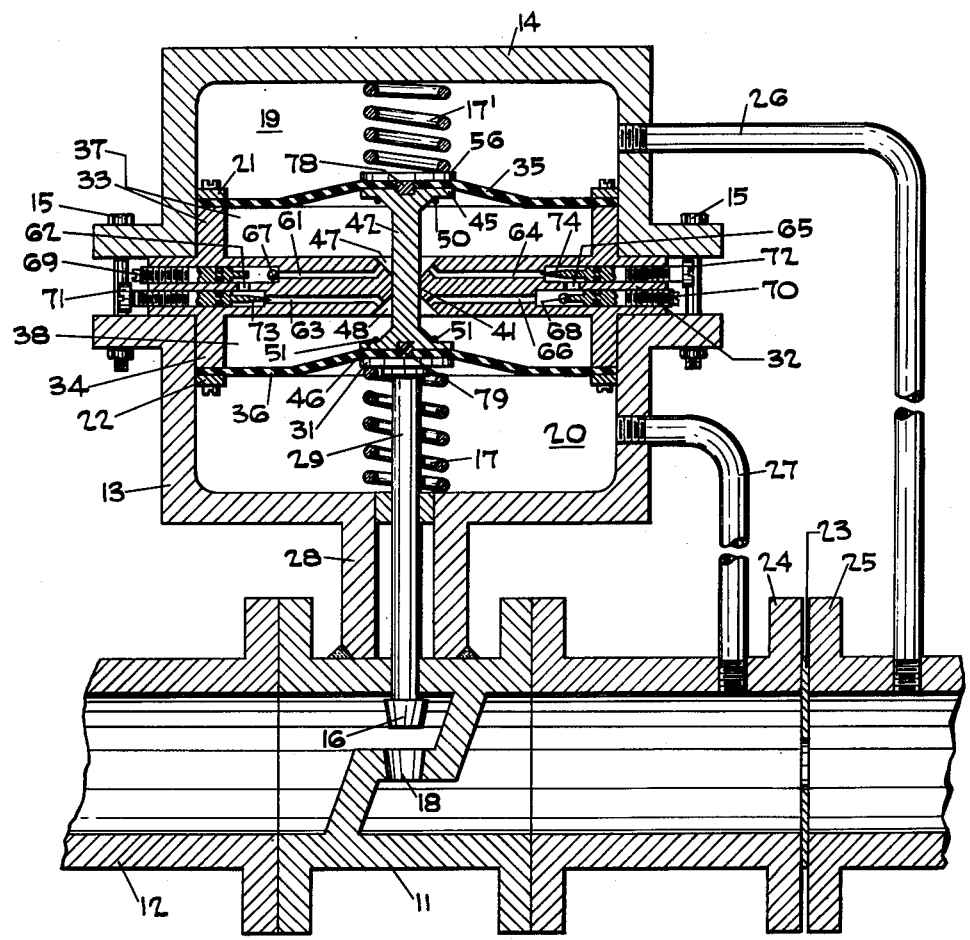

Dec. 18, 1951   N. PLANK   2,579,334
ADJUSTABLE-RATE DIFFERENTIAL PRESSURE RESPONSIVE DEVICE
Filed July 30, 1949

Inventor: Norris Plank
By [signature]
his Attorney

Patented Dec. 18, 1951

2,579,334

UNITED STATES PATENT OFFICE 2,579,334

ADJUSTABLE-RATE DIFFERENTIAL PRESSURE RESPONSIVE DEVICE

Norris Plank, East Chicago, Ind., assignor to Shell Development Company, San Francisco, Calif., a corporation of Delaware Application July 30, 1949, Serial No. 107,736

2 Claims. (Cl. 137—152.5)

This invention relates to pressure-responsive flow regulator and/or valve devices, and pertains more particularly to means whereby the actuation rate of such devices may be adjustably controlled.

In my copending applications, Serial No. 66,036, filed December 18, 1948 and Serial No. 72,308, filed January 24, 1949, of which the present application is a continuation-in-part, I have disclosed a self-energized, pressure-responsive pressure or flow regulator or motor valve used in controlling and maintaining predetermined pressures and/or rates of flow in fluid flow lines. The regulator comprises a valve body having fluid inlet and outlet ports, valve means interposed therebetween a housing having differential pressure-responsive diaphragm means forming two pressure chambers therein, and fluid conduit means in communication between said chambers and the fluid flow line or stream to be controlled.

The differential pressure-responsive diaphragm means in the regulator comprise two diaphragms, bellows or other resilient elements attached to rigid plate means and separated thereby to form two pressure compartments, there being an orifice through said plate means, and means for opening and closing the orifice in response to the pressure differential on the double bellows or diaphragms, said diaphragms being protected against possible injury by the closing of said orifice means. The two pressure compartments are filled with a fluid, a portion of which is transferred from one side of said plate means to the other through said orifice, as a greater pressure is applied to the outside of one of the diaphragms.

By utilizing a differential pressure-responsive double diaphragm means of the above-described type in a flow or pressure regulator, any sudden pressure surge through a flow line into said regulator is damped by the action of the double diaphragm means, which permit the regulator to be opened or closed at a suitably slow rate, thereby accomplishing smooth and stable operation.

In the diaphragm means disclosed in my copending applications, Serial No. 66,036, filed December 18, 1948 and Serial No. 72,308, filed January 24, 1949, the damping action is applied at a substantially constant rate when the valve means in the regulator is either opening or closing, so that the rate of damping, and hence the rate at which the regulator is opened or closed, cannot be changed without disassembling the regulator and changing the size of the orifice in the plate between the two diaphragms.

It is therefore an object of this invention to provide a damped pressure-responsive device provided with means for adjusting the damping rate to any desired predetermined value.

It is also an object of the present invention to provide a damped pressure-responsive device operating at different rates of damping when actuating a valve in different directions.

It is also an object of this invention to provide a damped pressure-responsive device having different rates of damped operation in opposite directions, said device being equipped with means for adjustably varying the damping rate in either direction without disassembling said device.

Other objects and advantages of the invention will become apparent from the following detailed description taken with reference to the drawing, wherein:

The single figure is a cross-sectional view of a pipe line control valve equipped with the pressure-responsive damping device of the present invention.

For purposes of illustrating the present pressure-responsive damping device, it is shown in the figure as being incorporated in a motor valve comprising a valve body 11 which is in turn positioned in and suitably connected in a pipe line 12. The motor valve also comprises a housing 13 suitably connected to the body 11 as shown at 28. A flanged bonnet 14 is secured to said housing 13 in any suitable manner, as by bolts 15. A plug-type valve 16 is mounted in the valve body 11, and has a stem 29 extending into the housing 13, said valve being actuated by a spring 17 to maintain said valve in a normally open position above its seat 18. If it is desired that the valve 16 should remain normally closed, the spring 17 may be removed, and another spring 17' suitably positioned in such case within the bonnet 14. The same results may also be achieved by leaving both springs 17 and 17' in the housing and making one of them stronger than the other.

The pressure-responsive damping device or the diaphragm assembly of the present invention is secured between the valve bonnet 14 and housing 13 thereby forming two pressure chambers 19 and 20 on either side of said damping device. The diaphragm assembly comprises a central support plate 32 having raised annular flanges 33 and 34 upon which a pair of flexible diaphragms 35 and 36 may be positioned or secured in spaced relationship to said plate 32 so as to form fluidtight compartments 37 and 38 on opposite sides thereof. The diaphragms 35 and 36 may be made of any flexible material, such as, for example, rubber, rubberized canvas, sheet metal, or the like, which may be secured in any suitable manner, as by clamping, cementing, soldering, etc., to the flanges 33 and 34. In this embodiment the diaphragms 35 and 36 are clamped between the flanges 33 and 34 and rings 21 and 22, respectively.

Slidably mounted in a bore 41 in the center of the support plate 32, is a valve stem 42. Secured to the ends of the valve stem 42 on opposite sides of said plate 32 and spaced therefrom are suitable valve-closure means, such as, for example, beveled valve plates 45 and 46, formed so as to fit tightly against the beveled valve seat 47 and 48 around the edges of the hole 41 when forced thereagainst. A more positive seal between the valves and their seats may be secured by the use of rubber ring seals 50 and 51 suitably secured to the valve plates. The overall length of the valve stem 42 including the thickness of plates 45 and 46 is preferably chosen so that the distance between the centers of the diaphragms 35 and 36 is equal to that at the peripheries. Both compartments 37 and 38 of the diaphragm assembly are filled with any suitable clean fluid such as oil, said fluid being relatively incompressible, of reasonably constant viscosity at operating temperatures and having a low freezing point.

The central support plate 32, positioned between diaphragms 35 and 36, is provided with channel or conduit means that permit fluid circulation from one side of plate 32 to the other. As shown in the drawing, the conduit means through said plate 32 may comprise a pair of fluid passageways, one of said passageways comprising flow channels 61, 62 and 63, and the second passageway comprising flow channels 64, 65 and 66. One end of each of the channels 61 and 66 is enlarged and tapped to accommodate ball members 67 and 68 and threaded fluidtight plugs 69 and 70, respectively, forming a pair of ball-type valves although any desired type of check valve may be used. One end of each of the channels 63 and 64 is similarly enlarged and tapped to accommodate therein threaded plugs 71 and 72 having tapering ends 73 and 74, respectively, adapted to vary the fluid flow through said channels 63 and 64. Thus, the tapering plugs 71 and 72 form needle valves which provide adjustable orifice means in the flow channels 63 and 64 within the body of the support plate 32. Channels 61 and 64 terminate at valve seat 47 and are effectively closed when valve plate 45 seats on valve seat 47. Similarly, channels 63 and 66 terminate a valve seat 48 and are closed when valve plate 46 seats in seat 48. The diaphragm assembly may be filled by removing plug 71 and/or 72 and filling through channels 63 and/or 64.

A second diaphragm contact disc 56 may be mounted above diaphragm 35 and may be secured through diaphragm 35 to valve plate 45 in any suitable manner as by a screw 78. A rod 29 and discs 31 may be secured, in a similar manner, through diaphragm 36 to valve plate 46, by a screw 79.

The operation of the device of the present invention in response to pressure differentials in a fluid flow system may be briefly described as follows: To create a head loss or differential pressure in the fluid flow line 12, any suitable valve or orifice plate 23 may be inserted in the flow line on the upstream or downstream side of the valve, as shown for example between flanges 24 and 25. The pressure chamber 19 above the upper diaphragm 35 of the damping device is in communication through a conduit 26 with the flow line 12 upstream of the orifice 23. In a like manner the lower pressure chamber 20 communicates with said flow line 12 downstream of the orifice 23 through a conduit 27. It is, however, understood that instead of the orifice arrangement shown, any other arrangement for obtaining pressure differentials, may be used, or different independent pressures may be applied to the opposite sides of the diaphragms by means such, for example, as pilot valves. A sudden increase in flow through the flow line 12 results in an increased differential pressure across the orifice 23 which is transmitted to pressure chambers 19 and 20 through conduits 26 and 27, respectively. The greater pressure in pressure chamber 19 would overcome the pressure exerted by spring 17 to force the upper diaphragm 35 and valve plate 45 downwards.

As diaphragm 35 and plate 45 are forced downwards, fluid is forced from compartment 37 through channels 61, 62 and 63 into compartment 38 and the valve stem 42 slides within the hole 41 in the central plate 32, whereby the attached valve plate 46, lower diaphragm 36, valve stem 29 and plug 16 will move downwards. A continued increase in pressure in pressure chamber 19 causes plug 16 to move down and seat on its seat 18. At the same time, valve plate 45 seats on its seat 47 thus closing flow channel 61 to stop the flow of fluid from compartment 37 to compartment 38 whereby the diaphragm 35 is protected from being ruptured by increased pressure within chamber 19. With a drop in pressure within the pressure chamber 19, the movement of the plug valve 16, rod 29 and diaphragms 35 and 36 is reversed.

The rate at which the valve opens and closes depends on the rate of transfer of the fluid from compartment 37 to compartment 38 and may be adjustably controlled by the setting of the tapered ends 73 and 74 of the plugs 71 and 72 within the flow channels 63 and 64. As the upper diaphragm 35 of the damping device is forced downwards, pressure fluid in the upper compartment 37 is forced through channels 61, 62 and 63, flowing past check valve 67 and needle valve 73. At the same time, the fluid forced through channels 64 and 65 closes check valve 68 thus preventing the passage of fluid through these channels from compartment 37 to compartment 38. When the flow rate in the pipe line decreases the resulting change in differential pressure, assisted, if necessary, by the action of the spring 17, forces diaphragm 36 upwards whereby the pressure fluid in compartment 38 is forced through flow channels 66, 65 and 64 and past check valve 68 and needle valve 74 while check valve 67 is closed.

Since the time in which the plug valve 16 may be opened or closed is dependent upon the rate at which pressure fluid is transferred from one pressure compartment 37 or 38 to the other, a predetermined opening and closing time of the plug valve may be selected by properly adjusting the needle valves 73 and 74 of the damping device, whereby the fluid transfer rate may be changed at any time without dismantling the entire valve. It is also possible to set the needle valves 73 and 74 so that the transfer of fluid from compartment 37 to compartment 38 takes place at a rate different from that of the fluid transfer in the opposite direction, that is, from compartment 38 to compartment 37. Thus, the valve 16 may be set to close slowly and open rapidly, or to close rapidly and open slowly within any desired practical time periods such as from 3 to 40 seconds. It will be obvious to those skilled in the art that the present diaphragm damping device may be used either to open or close flow line valves or regulators with an increase or decrease of pressure therein.

The present motor valve is of special advantage in the operation of pipe lines and pipe line pump stations, where the exigencies of service often require a valve to be opened and closed at different rates. Thus, a main control valve positioned in the discharge line of a pump station may be required to open completely only about 30 seconds after the pump is started in order to permit the pump to come up to normal speed without being overloaded. If, however, a failure occurs in the pipe line above the pump, this same valve must be able to close within 5 seconds to prevent the pump from being damaged by running dry. It will be understood that the pump described hereinabove is eminently well adapted to this type of service.

It will also be understood that although the present controller or motor valve has been hereinabove described for simplicity with regard to operation in direct response to pipe line pressures, said motor valve may be made responsive to pilot valves in the manner described in my copending applications referred to hereinabove.

Similarly, although the present device was described for simplicity as involving the actuation of a simple plug-type valve, said actuation may be applied without any change of principle to valves of other and more complex structure, such for example as those incorporating auxiliary valves of the needle-valve type, described in said copending applications.

I claim as my invention:

1. A fluid-pressure responsive device comprising a fluid-tight housing, a rigid support plate element dividing the space within the housing into two chambers, said element having an aperture therethrough, a collapsible partition member mounted on either side of the support element to form a liquid-filled compartment within each of said chambers adjacent said support element, inlet means in the housing for supplying a pressure-fluid to said chambers on the outside of said collapsible compartments, a stem slidingly extending through the aperture in the support element and substantially blocking said aperture to liquid flow, said stem being connected on either side of said support element to one of the collapsible partition members, whereby said collapsible partition members are displaced together in one direction in response to pressure differentials between said chambers, and liquid flow means in communication between said compartments, said flow means comprising at least two separate channel means, check valve means in each of said channel means permitting flow therethrough only in a direction opposite to that of the other channel means, control valve means in said channel means for adjusting the flow rate therethrough to a desired value, and valve means carried by said stem for closing said channel means when either of said collapsible partition members are subjected to excessive pressure.

2. A fluid-pressure responsive device comprising a fluid-tight housing, a rigid support plate element dividing the space within the housing into two chambers, said element having an aperture therethrough, a collapsible partition member mounted on either side of the support element to form a liquid-filled compartment within each of said chambers adjacent said support element, inlet means in the housing for supplying a pressure-fluid to said chambers on the outside of said collapsible compartments, a stem slidingly extending through the aperture in the support element and substantially blocking said aperture to liquid flow, said stem being connected on either side of said support element to one of the collapsible partition members, whereby said collapsible partition members are displaced together in one direction in response to pressure differentials between said chambers, and liquid flow means in communication between said compartments, said flow means comprising at least two separate channel means, check valve means in each of said channel means permitting flow therethrough only in a direction opposite to that of the other channel means, control valve means in said channel means for adjusting the flow rate therethrough to a desired value, valve means carried by said stem for closing said channel means when either of said collapsible partition members is subjected to excessive pressure, and spring means mounted within said housing against the collapsible partition member of at least one of said liquid-filled compartments for limiting the movement of said partition member until the pressure differential existing between the two chambers is at a predetermined value.

NORRIS PLANK.

REFERENCES CITED

The following references are of record in the file of this patent:

UNITED STATES PATENTS

| Number | Name | Date |
|---|---|---|
| 333,831 | Corliss | Jan. 5, 1886 |
| 632,744 | Petsche | Sept. 12, 1899 |
| 1,699,676 | Rush | Jan. 22, 1929 |
| 1,787,686 | Kerr | Jan. 6, 1931 |
| 1,797,751 | Berry | Mar. 24, 1931 |
| 1,886,712 | Messier | Nov. 8, 1932 |
| 2,167,623 | Britter | Aug. 1, 1939 |
| 2,400,048 | Jones | Mar. 7, 1946 |

FOREIGN PATENTS

| Number | Country | Date |
|---|---|---|
| 412,759 | Great Britain | of 1934 |